Sept. 1, 1964 G. C. WOOD 3,146,571
ROTARY SIDE DELIVERY RAKES
Filed Oct. 5, 1960 3 Sheets-Sheet 1
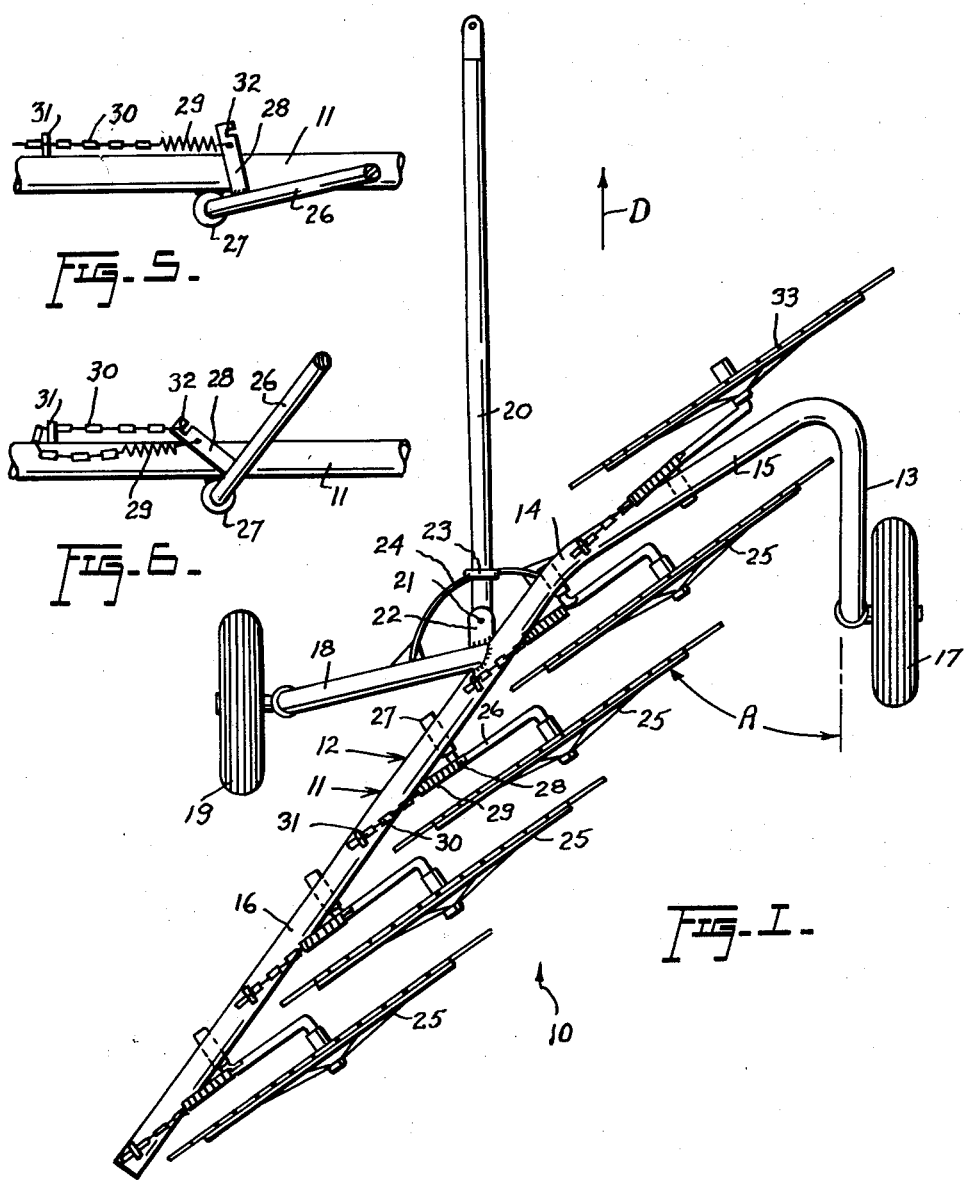
INVENTOR.
George C. Wood
BY
ATTORNEY

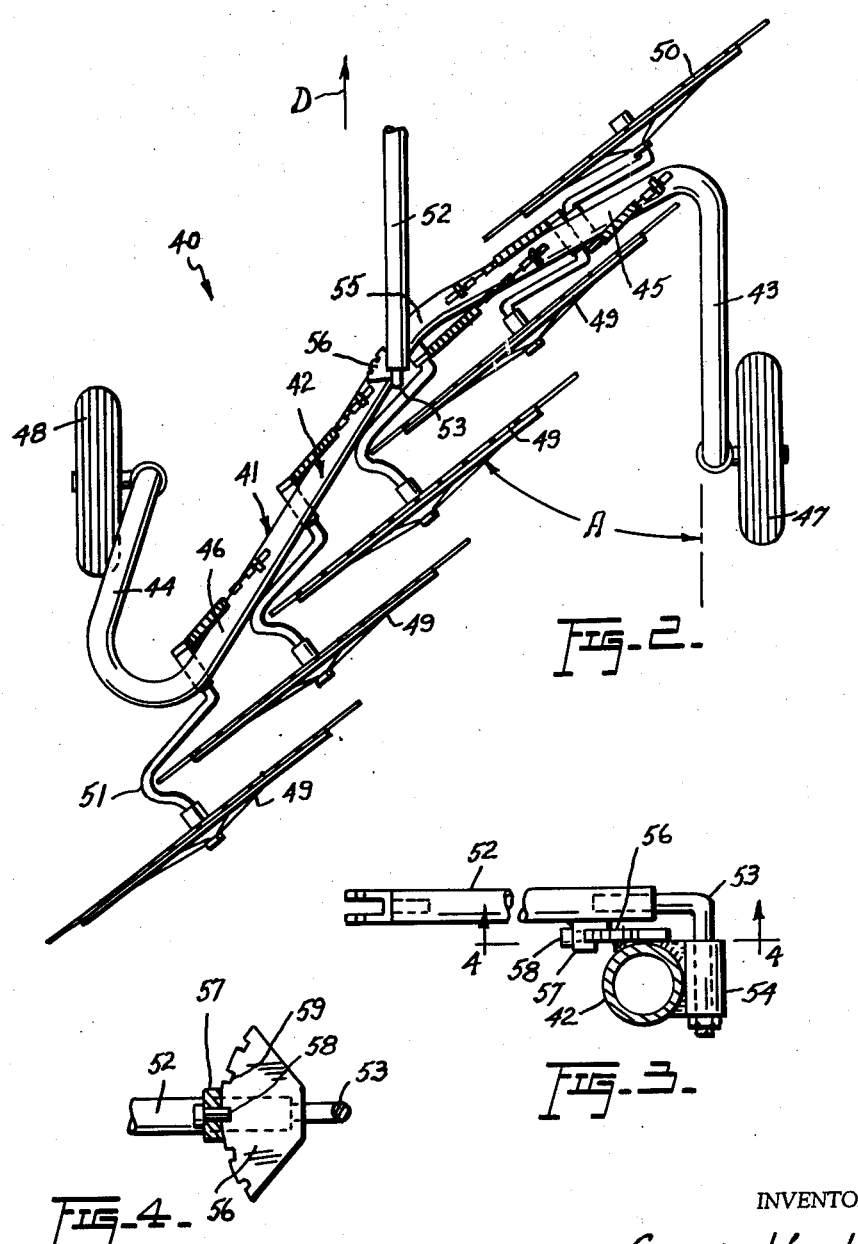

United States Patent Office 3,146,571
Patented Sept. 1, 1964

3,146,571
ROTARY SIDE DELIVERY RAKES
George C. Wood, Edenton, N.C.
Filed Oct. 5, 1960, Ser. No. 60,667
7 Claims. (Cl. 56—377)

This invention relates to new and useful improvements in rotary side delivery rakes, and in particular the invention concerns itself with improvements in rakes of the type disclosed in Cooley Patent No. 2,844,935, dated July 29, 1958.

The principal object of the invention is to substantially simplify the frame structure of such rakes, thus rendering the same more easy and economical to manufacture, lighter in weight and less cumbersome to operate.

Another important object of the invention is to provide an improved frame structure for such rakes, which frame structure is so arranged that some of the raking wheels may operate rearwardly of or behind the frame structure and therefore be pulled thereby, while one of the raking wheels operates forwardly of the frame structure and is pushed thereby, the combined pulling and pushing effect of the various raking wheels resulting in a more efficient raking operation.

Another important object of the invention involves the provision of means on the frame structure for selectively maintaining the raking wheels off the ground while the rake is being transported.

With the above more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a top plan view of one embodiment of the rake in accordance with the invention;

FIGURE 2 is a top plan view of another embodiment thereof;

FIGURE 3 is a fragmentary sectional detail on an enlarged scale, showing the connection of the hitching bar to the frame member of the embodiment of FIGURE 2;

FIGURE 4 is a fragmentary sectional detail, taken substantially in the plane of the line 4—4 in FIGURE 3;

FIGURE 5 is a fragmentary side elevational view of the raking wheel biasing means such as may be used in either the embodiment of FIGURE 1 or of FIGURE 2, the biasing means being shown in its operative position;

FIGURE 6 is a view similar to that shown in FIGURE 5 but illustrating the biasing means as used for maintaining the raking wheel off the ground;

Figure 7:
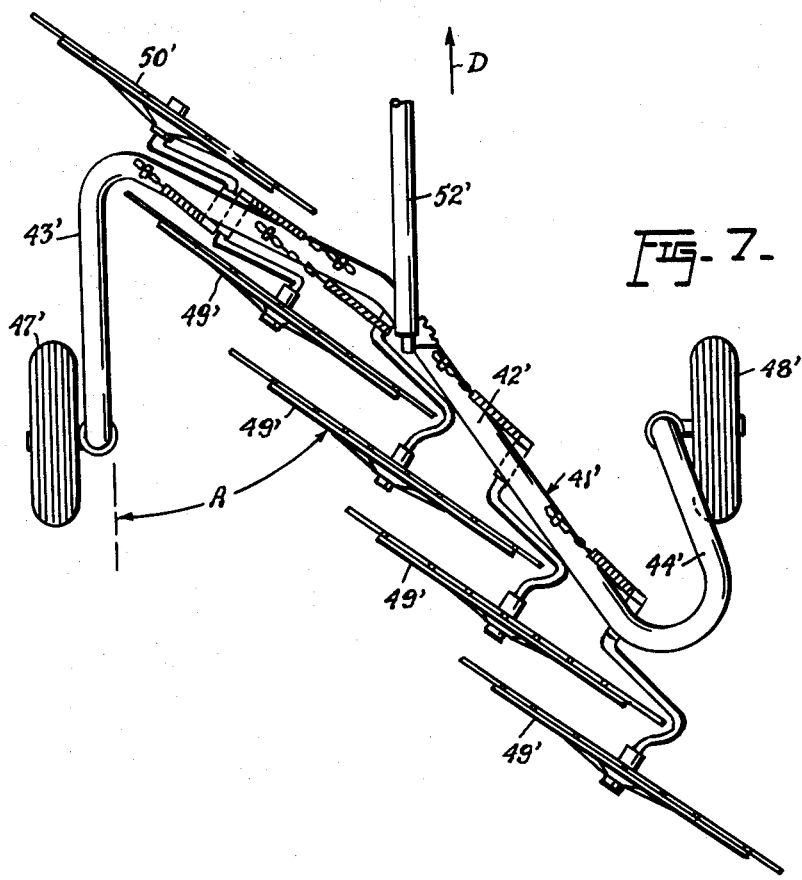
FIGURE 7 is a view similar to FIGURE 2 but showing the frame member transposed from the position shown in FIGURE 2.

Referring now to the accompanying drawings in detail, particularly to FIGURE 1, the rotary side delivery rake in accordance with the invention is designated generally by the numeral 10 and embodies in its construction an elongated frame member 11 having a main portion 12 disposed obliquely to the direction of travel D of the rake, and a reversely directed end portion 13 which is substantially parallel to the direction of travel. The main portion 12 is angulated intermediate its ends as at 14 so as to provide a relatively short front region 15 and a relatively long back region 16, the back region having a smaller degree of angularity to the direction of travel than the front region, as will be apparent.

The end portion 13 is integral with the front end of the front region 15 and extends rearwardly therefrom, its rear end being downturned and provided with a travelling wheel 17 mounted for rotation in a plane parallel to the direction of travel. A second frame member 18, which is straight in plan view, is secured at one end thereof by welding, or the like, to the main portion 12 of the frame member 11 and projects laterally outwardly as shown, its outer end being downturned and provided with a second travelling wheel 19 which is substantially transversely aligned with the wheel 17 also mounted for rotation in a plane parallel to the direction of travel. The frame member 18 is connected to the member 11 at a point adjacent the angulation 14. A suitable hitching bar 20 is attached to the main portion 12 of the frame member 11 adjacent the member 18, this being effected by a pivot connection 21 between the bar and a bracket 22 secured to the frame member, so that the bar 20 may be angularly adjusted in a horizontal plane to correspondingly adjust the lateral spacing or offset of the rake from the tractor by which it is drawn. The bar 20 carries a clamp 23 which engages a curved bar or segment 24 secured to the rake frame, whereby the bar 20 may be locked in a predetermined, angularly adjusted position.

A plurality of rotatable raking wheels 25 are mounted for raising and lowering movement on the back region 16 of the main portion 12 of the frame member 11 and are disposed rearwardly thereof so that they are pulled when the rake is drawn in the direction D. The structure and mounting of these wheels is substantially the same as disclosed in the aforementioned Patent No. 2,844,935, it being understood that each raking wheel is supported by a crank arm 26 journalled in a bearing 27 on the rake frame. The crank arm 26 is provided with an upstanding strap 28 to which is connected one end of a tension spring 29 having its other end connected to a length of chain 30, best shown in FIGURE 5. The links of the chain are selectively engageable with a notched keeper plate 31 secured to the frame, whereby the tension of the spring 29 may be adjusted so as to bias the crank arm upwardly with sufficient force to substantially counter-balance the weight of the associated raking wheel. When the rake is being transported, the chain 30 may be engaged with the keeper plate 31 as well as in a notch 32 formed in the strap 28 as shown in FIGURE 6, so that a fixed, predetermined length of the cain extends between the strap and the keeper plate to sustain the associated raking wheel off the ground.

An additional raking wheel 33 is provided, being mounted on and disposed forwardly of the front region 15 of the main portion 12 of the frame member 11, whereby the wheel 33 is pushed rather than pulled when the rake is in operation. The mounting of the wheel 33 is substantially the same as that of the wheels 25, and the combined pulling and pushing effect of the several wheels results in a more efficient raking operation.

It is to be noted that the several raking wheels 25, 33 operate and move freely up and down in spaced parallel substantially vertical planes which are offset by the angle A from the direction of travel D, the magnitude of the angle A amounting to approximately 52°. The arrangement of the frame member 11 is such that the front region 15 is disposed between the wheel 33 and the next adjacent of the wheels 25 and the frame arrangement permits relatively smaller raking wheels with a smaller number of raking teeth thereon to be employed with the same operational overlap of the wheels as exists, for example, in the aforementioned Patent No. 2,844,935. Moreover, as compared to the frame structure in that patent, the present invention utilizes a simple weld of the frame member 18 to the member 11 and dispenses with the two angulated frame members and associated gusset structure of that patent.

As will be apparent from the above description and from a consideration of the drawings, the group of raking wheels 25 and 33 are arranged in echelon and the angle which said echelon forms with the direction of travel is less or more acuate than the angle formed between the diagonal frame and the direction of travel, regardless of the number of raking wheels employed in front of or in rear of the diagonal frame.

The modified embodiment of the invention shown in FIGURES 2–4 and designated generally by the reference numeral 40 utilizes a substantially S-shaped frame member 41 having a main or intermediate portion 42 obliquely inclined with reference to the direction of travel D and a pair of integral end portions 43, 44. The intermediate portion 42 includes a front region 45 and a back region 46, the arrangement of which is similar to that already explained in connection with the embodiment of FIGURE 1. The end portion 43 extends rearwardly from the front end of the front region 45 and carries a travelling wheel 47 at its rear end, while the end portion 44 extends forwardly from the rear end of the back region 46 and carries a travelling wheel 48 at its front end, the wheels 47, 48 being substantially transversely aligned.

The raking wheels 49 are mounted in the manner already described on the front and rear or back regions of the intermediate portion 42 and rearwardly thereof so as to be subjected to a pull, while an additional raking wheel 50 is mounted on and forwardly of the front region 45 so as to be subjected to a push. The arrangement of the wheels relative to the frame in this embodiment is such that some of the crank arms supporting the raking wheels are curved or offset as exemplified at 51, in order to provide clearance for the adjacent raking wheels, as will be clearly apparent.

The hitching bar 52 in this embodiment is equipped with an angulated rod portion 53 at its inner end, which rod portion is rotatably journalled in a vertical sleeve or bearing 54 secured to one side of the frame portion 42 adjacent the bend or angulation 55 between the regions 45 and 46. The frame portion 42 also has secured thereto a sector plate 56, an edge portion of which is slidably engaged by a guide 57 secured to the underside of the bar 52. The guide 57 is provided with a removable keeper pin 58 which is selectively received in notches 59 of the sector plate, whereby to retain the bar 52 in a preadjusted position relative to the frame of the rake.

As in the embodiment of FIGURE 1, the ends of the frame portions 43, 44 of the embodiment of FIGURE 2 are downturned to carry the respective wheels 47, 48.

While the frame member 41 as shown in FIGURE 2 has been referred to as being substantially S-shaped, its arrangement may be transposed so that it is substantially Z-shaped or reversed S-shaped, as illustrated by the frame member 41' in FIGURE 7. In such a transposed arrangement the intermediate portion 42' extends obliquely from left to right rather than from right to left, with the end portion 44' projecting forwardly and the end portion 43' projecting rearwardly from the ends of the intermediate portion 42'. However, the arrangement of the raking wheels in FIGURE 7 is the same as in FIGURE 2, in that the wheels 49' are disposed rearwardly and the wheel 50' forwardly of the frame portion 42'. The travelling wheels, 47', 48' and the hitching bar 52' are provided in the embodiment of FIGURE 7 as in that of FIGURE 2.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, such as may lie within the spirit and scope of the invention as claimed.

What is claimed as new is:

1. A rotary side delivery rake comprising the combination of an elongated frame member having a main portion disposed obliquely to the direction of travel of the rake, and at least one reversely directed end portion, a traveling wheel carried by said end portion and mounted thereon for rotation in a plane parallel to the direction of travel, a plurality of raking wheels, and means mounting said raking wheels on said main portion of said frame for raising and lowering movement in substantially vertical parallel planes oblique to the direction of travel, some of said raking wheels being disposed rearwardly and at least one of said wheels being disposed forwardly of said obliquely disposed frame portion, the angle formed by a line drawn from the center of rotation of a raking wheel disposed forwardly of the obliquely disposed frame portion to the center of rotation of any one of the rearwardly disposed raking wheels, and the line of travel, being less than the angle formed by the diagonal frame portion with the line of travel.

2. A rotary side delivery rake as set forth in claim 1 wherein a second traveling wheel is carried by said frame spaced laterally from and substantially parallel to said first traveling wheel.

3. The device as defined in claim 1 together with a second frame member secured to the obliquely disposed portion of the first mentioned frame member and extending laterally therefrom, and a second travelling wheel provided on said second frame member substantially in transverse alignment with the first mentioned travelling wheel.

4. A side delivery hay rake having a frame, said frame containing draft means projecting generally forwardly, said frame having its major portion elongated diagonally relative to its direction of forward travel and its generally longitudinally extending draft means, projections supportingly extended from said diagonal portion containing transporting means at their outer regions, said supporting projections extending from said major diagonal portion and spaced laterally for horizontal support thereto, said supporting projections cooperating with said draft means to constitute the longitudinal support for said frame, a plurality of generally parallel rotary raking means collectively forming a lateral hay conveying echelon, the angle said echelon forms with the forward line of travel of said rake being more acute than the angle formed by said major diagonal frame portion of said frame with said direction of travel, said rotary raking means comprising a plurality of raking wheels disposed rearwardly of said major diagonal portion and at least one raking wheel disposed forwardly of said major diagonal frame portion, each of said raking wheels being connected by support means to said frame so as to rise and fall in accordance with the terrain below each and maintain their planes of rotation generally erect and diagonally related to the direction of forward travel, the angle which the echelon forms with the direction of travel being determined by the angle formed by a line drawn from the center of rotation of a raking wheel disposed forwardly of the diagonal major frame portion, to the center of any one of the rearwardly disposed raking wheels and the line of travel, and being less than the angle formed by the diagonal frame portion with said line of travel.

5. In a structure as described in claim 4 wherein said lateral hay conveying echelon is so angularly related to said major diagonal frame portion as to constitute a configuration approximating an "X" with reference to said major diagonal frame portion.

6. In a structure as described in claim 4 wherein said major diagonal frame portion passes between an adjacent pair of said rotary raking means in said echelon to position at least one of said rotary raking means on the forward side of said frame with said draft means and the remaining raking means rearwardly of said frame and draft means.

7. In a structure as described in claim 4 wherein one of said supporting projections extends from behind said forward raking means rearwardly to said transporting means.

References Cited in the file of this patent

UNITED STATES PATENTS

| | | |
|---|---|---|
| 2,727,351 | Plant | Dec. 20, 1955 |
| 2,844,935 | Cooley | July 29, 1958 |
| 2,851,845 | Van der Lely et al. | Sept. 16, 1958 |
| 3,006,133 | Van der Lely et al. | Oct. 31, 1961 |